(12) United States Patent
Zordan et al.

(10) Patent No.: US 9,689,313 B2
(45) Date of Patent: Jun. 27, 2017

(54) DUAL-CIRCUIT MODULAR INJECTION TUBE

(71) Applicant: TURBOMECA, Bordes (FR)

(72) Inventors: Cedric Roger Zordan, Narcastet (FR); Xavier Francez, Bordes (FR)

(73) Assignee: TURBOMECA, Bordes (FR)

( * ) Notice: Subject to any disclaimer, the term of this patent is extended or adjusted under 35 U.S.C. 154(b) by 241 days.

(21) Appl. No.: 14/419,741

(22) PCT Filed: Jul. 29, 2013

(86) PCT No.: PCT/FR2013/051822
§ 371 (c)(1),
(2) Date: Feb. 5, 2015

(87) PCT Pub. No.: WO2014/023892
PCT Pub. Date: Feb. 13, 2014

(65) Prior Publication Data
US 2015/0176496 A1 Jun. 25, 2015

(30) Foreign Application Priority Data

Aug. 6, 2012 (FR) ...................................... 12 57622

(51) Int. Cl.
*F02C 7/22* (2006.01)
*F23R 3/28* (2006.01)
(Continued)

(52) U.S. Cl.
CPC ................ *F02C 7/222* (2013.01); *F02C 7/22* (2013.01); *F02C 7/228* (2013.01); *F02C 9/26* (2013.01);
(Continued)

(58) Field of Classification Search
CPC .. F02C 7/222; F02C 7/228; F02C 7/22; F23R 3/28; F23R 3/36
See application file for complete search history.

(56) References Cited

U.S. PATENT DOCUMENTS 3,793,838 A 2/1974 Nash
4,305,255 A * 12/1981 Davies ...................... F02C 7/22
60/741

(Continued)

FOREIGN PATENT DOCUMENTS

| CA | 1 170 844 | 7/1984 |
|----|-----------|--------|
| EP | 1 906 091 | 4/2008 |
| GB | 2461503 | 1/2010 |

OTHER PUBLICATIONS

International Search Report Issued Nov. 4, 2013 in PCT/FR13/051822 Filed Jul. 29, 2013.

*Primary Examiner* — Steven Sutherland
(74) *Attorney, Agent, or Firm* — Oblon, McClelland, Maier & Neustadt, L.L.P.

(57) ABSTRACT

A turbomachine injection manifold assembly including a main circuit for feeding fuel to sets of injectors, and an auxiliary circuit for feeding fuel to a set of injectors. The manifold assembly also includes a double coupling presenting a first endpiece receiving one end of a transfer tube of the main circuit, a second endpiece receiving one end of a transfer tube of the auxiliary circuit, and a mounting surface with a first orifice in fluid flow communication with the first endpiece and a second orifice in fluid flow communication with the second endpiece, the mounting surface of the double coupling being suitable for connecting the double coupling to an injector of said first set of injectors.

9 Claims, 6 Drawing Sheets

(51) Int. Cl.
*F23R 3/36* (2006.01)
*F02C 7/228* (2006.01)
*F02C 9/26* (2006.01)

(52) U.S. Cl.
CPC ............... *F23R 3/28* (2013.01); *F23R 3/36* (2013.01); *F05D 2220/32* (2013.01); *F05D 2270/31* (2013.01)

(56) References Cited

U.S. PATENT DOCUMENTS

| | | | | |
|---|---|---|---|---|
| 5,031,407 | A | * | 7/1991 | Zaremba ................ F23R 3/283 60/739 |
| 5,211,005 | A | | 5/1993 | Hovnanian |
| 5,257,502 | A | * | 11/1993 | Napoli ................... F02C 7/228 60/739 |
| 5,263,314 | A | * | 11/1993 | Anderson ............... F02C 7/222 137/312 |
| 6,339,924 | B1 | * | 1/2002 | Hoyer ..................... F02C 7/00 60/39.094 |
| 2003/0056578 | A1 | | 3/2003 | Mitchell et al. |
| 2003/0171880 | A1 | | 9/2003 | Mitchell et al. |
| 2003/0217545 | A1 | * | 11/2003 | Parsons .................. F23K 5/06 60/39.281 |
| 2010/0146928 | A1 | * | 6/2010 | Morenko ................ F02C 7/222 60/39.094 |

\* cited by examiner

DUAL-CIRCUIT MODULAR INJECTION TUBE

BACKGROUND OF THE INVENTION

The present invention relates to the field of turbomachines and more particularly to the field of injection manifold assemblies for turbomachines.

In the present context, the term "turbomachine" covers any machine in which energy can be transferred between a flow of fluid and at least one set of blades, such as for example a compressor, a pump, a turbine, or indeed a combination of at least two of these. Certain internal combustion turbomachines, such as gas turbines, turboshaft engines, turbofans or turbojets, or turboprops, enable the chemical energy of a fuel to be converted into mechanical energy by combustion of the fuel in the working fluid, with combustion taking place in a combustion chamber. Typically, such turbomachines comprise at least one compressor upstream from the combustion chamber and at least one turbine downstream from the combustion chamber and coupled to the compressor in order to actuate it by partial expansion of the working fluid as heated by the combustion of the fuel. Normally, a remainder of the thermal energy of the working fluid can then be recovered as mechanical energy by a jet nozzle and/or by at least one additional turbine coupled to a drive shaft. The terms "upstream" and "downstream" are defined relative to the normal flow direction of the working fluid through the turbomachine.

In order to ensure that combustion takes place uniformly within the combustion chamber, fuel is normally introduced therein via a plurality of injectors. When the combustion chamber is annular, these injectors are normally distributed around the combustion chamber and fed with fuel via at least one injection manifold assembly.

When starting the turbomachine, in order to be able to obtain a mixture that is sufficiently rich at least locally to enable ignition, even with a total flow rate of fuel that is initially small, it may be necessary, or at least advantageous, to restrict the feeding of fuel to only some of the injectors. Nevertheless, that normally requires injector manifold assemblies that are more complex, since they incorporate, in parallel with a main circuit, an auxiliary circuit for use when starting the turbomachine. This additional complexity makes fabricating injection manifold assemblies more difficult and more expensive and it also makes them more complicated to maintain.

OBJECT AND SUMMARY OF THE INVENTION

The present invention seeks to remedy those drawbacks and in particular to propose an injection manifold assembly for a turbomachine that is easy to assemble and that nevertheless enables fuel to be fed selectively to certain injectors via an auxiliary circuit in parallel with a main circuit. Since the uniformity of combustion on starting is less important than during normal operation of the turbomachine, it is possible to limit the feed of fuel on starting to a first set of injectors only.

For this purpose, an injection manifold assembly for a turbomachine in at least one embodiment of the invention comprises a first set of transfer tubes connected so as to form a main circuit for feeding fuel to at least first and second sets of injectors, a second set of transfer tubes connected in parallel with the first set of transfer tubes so as to form an auxiliary circuit for feeding fuel to said first set of injectors, at least one double coupling, and at least one single coupling. The double coupling presents at least one first endpiece receiving one end of a transfer tube of the main circuit, a second endpiece receiving one end of a transfer tube of the auxiliary circuit, and a mounting surface with a first orifice in fluid flow communication with the first endpiece and a second orifice in fluid flow communication with the second endpiece, said mounting surface of the double coupling being suitable for connecting the double coupling to an injector of said first set of injectors. The single coupling presents at least one single coupling presenting at least a first endpiece receiving one end of a transfer tube of the main circuit, and a mounting surface with an orifice in fluid flow communication with the first endpiece, said mounting surface of the single coupling being suitable for connecting the single coupling to an injector of said second set of injectors. In particular, said single coupling need not present any endpiece in fluid flow communication with the auxiliary circuit. The couplings thus enable an injection manifold assembly having two parallel circuits to be assembled easily merely by inserting the ends of transfer tubes in corresponding endpieces, with it thus being possible for the auxiliary circuit to feed only the injectors of the first set for starting, while the main circuit also feeds the injectors of the second set in order to distribute fuel better throughout the combustion chamber at normal operating speeds of the turbomachine.

In particular in order to enable the main circuit to be lengthened, the double coupling may also present a third endpiece receiving one end of a second transfer tube of the main circuit and also in fluid flow communication with the first orifice.

In particular in order to enable the main circuit to be lengthened, said single coupling may also present a second endpiece, receiving one end of another transfer tube of the main circuit and also in fluid flow communication with the orifice in the mounting surface of the single coupling.

In order in particular to facilitate feeding the main circuit with fuel, the manifold assembly may further include a feed coupling suitable for being connected to a first source of fuel and presenting at least a first endpiece receiving one end of a transfer tube of the main circuit for feeding it with fuel from said first source. In order in particular to increase the number of injectors, while limiting the number of components in the manifold assembly, said feed coupling may also include a mounting surface with an orifice in fluid flow communication with the first endpiece of the feed coupling, said mounting surface of the feed coupling being suitable for connecting the feed coupling to an injector, and in particular an injector of said second set of injectors, for feeding it with fuel from said first source. Said feed coupling may also be suitable for being connected to a second source of fuel in parallel with the first source and may also present at least one second endpiece receiving one end of a transfer tube of the auxiliary circuit for feeding it with fuel from said second source, thereby serving in particular to make it easier to feed the auxiliary circuit with fuel.

The present invention also provides a combustion chamber including such an injection manifold assembly, and a turbomachine including such a combustion chamber.

BRIEF DESCRIPTION OF THE DRAWINGS

The invention can be well understood and its advantages appear better on reading the following detailed description of an embodiment given by way of non-limiting example. The description refers to the accompanying drawings, in which.

DETAILED DESCRIPTION OF THE INVENTION

Figure 1:
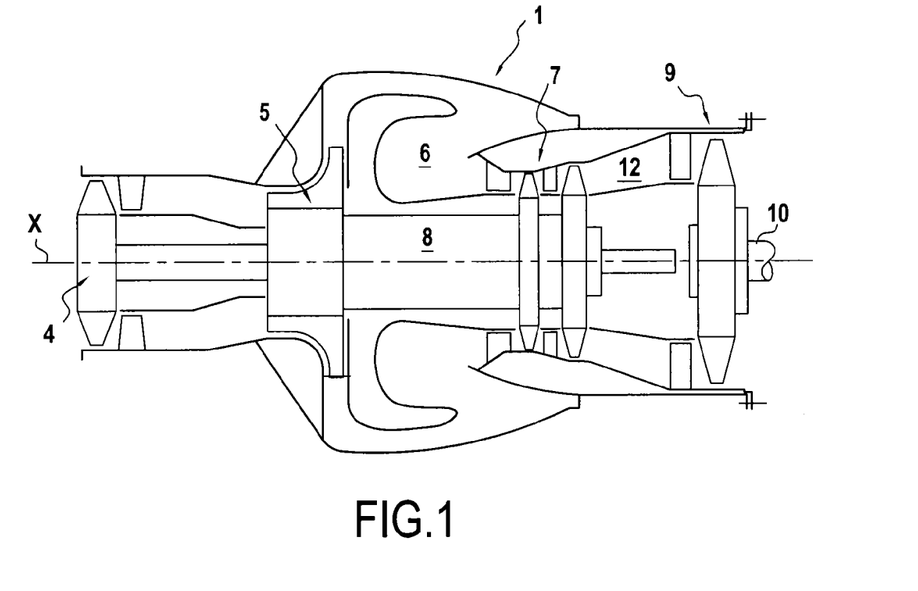
FIG. 1 is a diagrammatic longitudinal section view of a turbomachine.

A turbomachine, and more specifically a turboshaft engine 1 is shown in FIG. 1. This engine 1 comprises an axial compressor 4, a radial compressor 5, an annular combustion chamber 6, a first combustion gas turbine 7, and a first rotary shaft 8 of central axis X for coupling together in rotation the disks of the first combustion gas turbine 7 and the compressors 4 and 5, in such a manner that rotation of the turbine serves to actuate the compressors 4 and 5 while the engine 1 is in operation. The engine 1 also has a second combustion gas turbine 9 known as a "free" turbine and a second rotary shaft 10, likewise in alignment with the central axis X, and coupling the free turbine 9 to a power outlet. Thus, rotation of the disk of the free turbine 9 while the engine 1 is in operation can serve to actuate an external device, such as a helicopter rotor, for example.

Figure 2A:
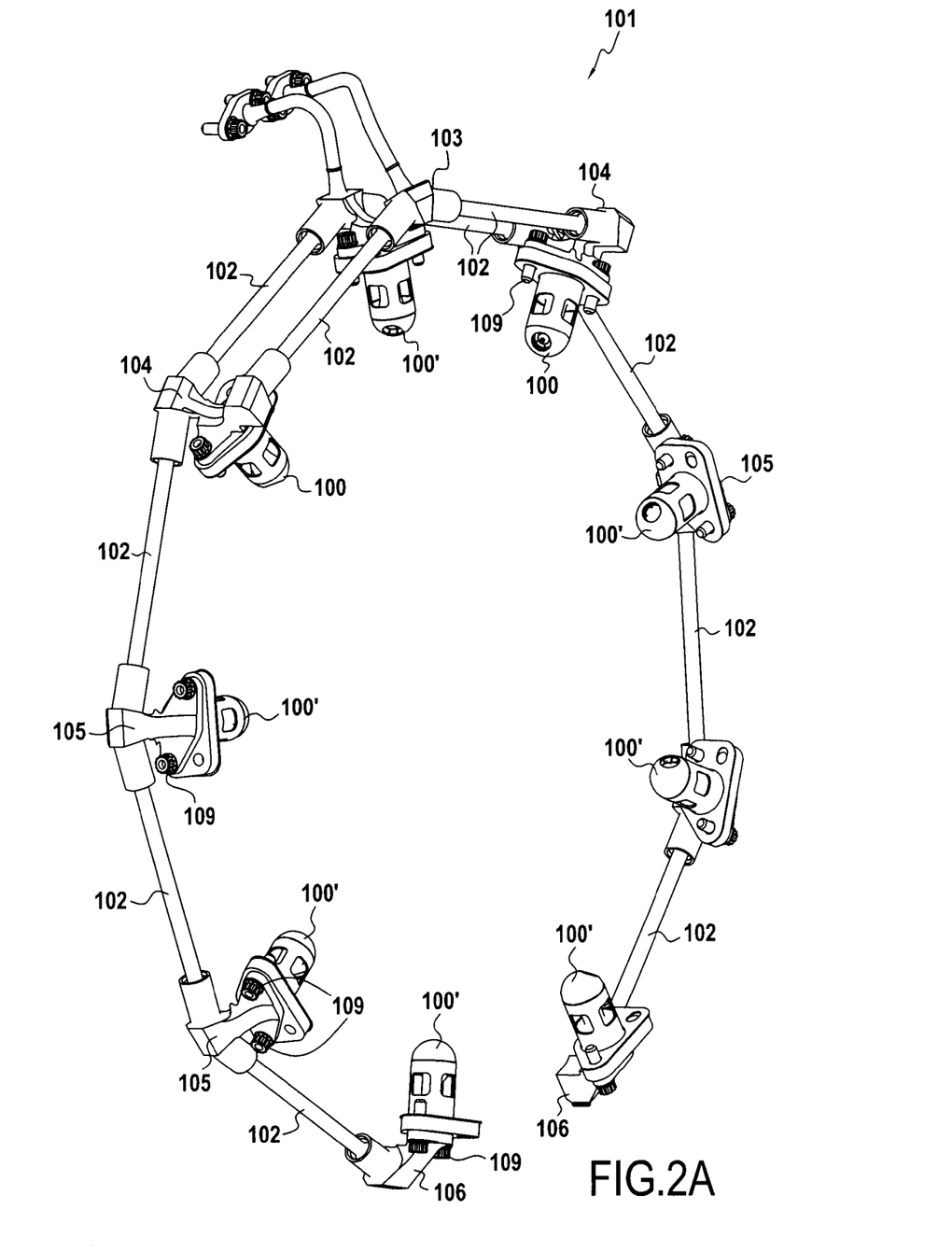
FIG. 2A is a perspective view of an injection manifold assembly in an embodiment of the invention, connected to a plurality of injectors.
Figure 2B:
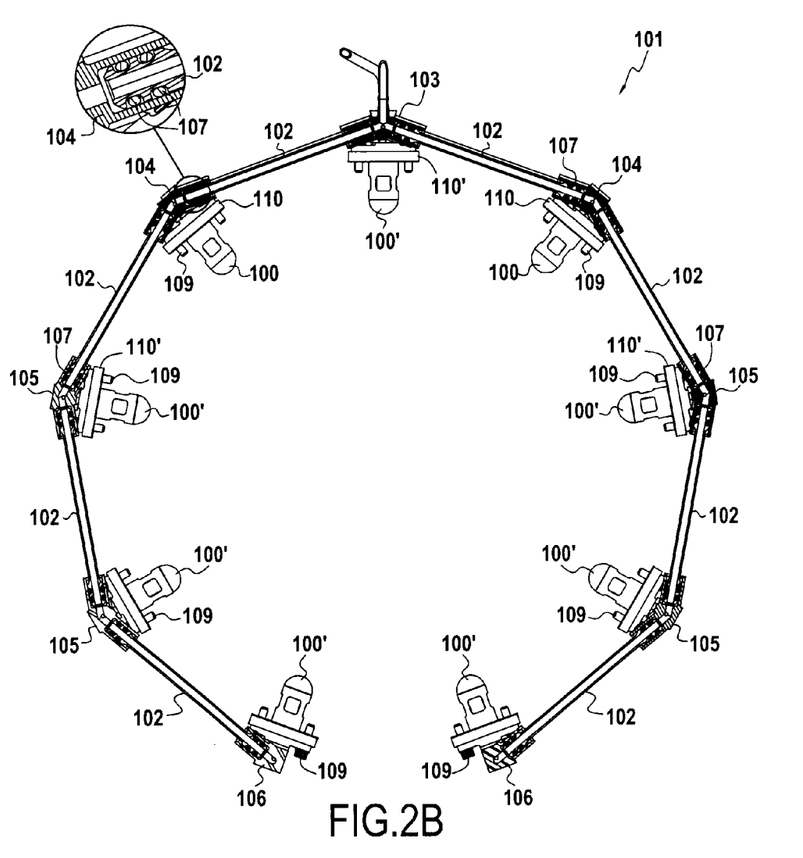
FIG. 2B is a cutaway view of the FIG. 2A injection manifold assembly and injectors.

In order to inject fuel into the combustion chamber 6, the combustion chamber has a plurality of injectors 100, 100' distributed all around the combustion chamber 6 and connected to sources of fuel (not shown) by an injection manifold assembly 101, as shown in FIGS. 2A and 2B. This plurality of injectors 100, 100' comprises a first set of injectors 100 and a second set of injectors 100'. The injectors 100 of the first set are suitable for injecting, in addition to a flow of fuel coming from a first source of fuel, a flow of fuel coming from a second source of fuel, whereas the manifold assembly 101 connects the injectors 100' of the second set only to the first source of fuel. For this purpose, the injection manifold assembly 101 comprises two fuel circuits in parallel: a main circuit connecting the first fuel source to the injectors 100, 100' of the first and second set, and an auxiliary circuit connecting the second source of fuel solely to the injectors 100 of the first set.

Figure 3A:
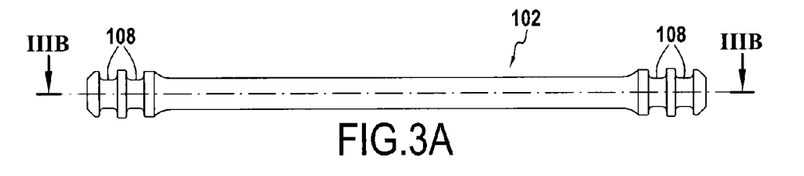
FIGS. 3A and 3B are a side view and a longitudinal section view of a transfer tube in the injection manifold assembly of FIGS. 2A and 2B.
Figure 3B:
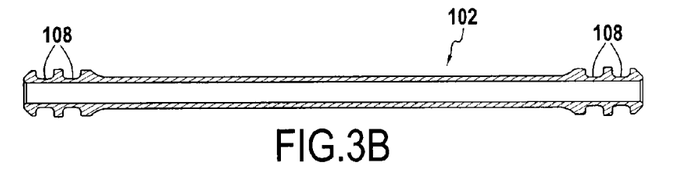
Figure 4A:
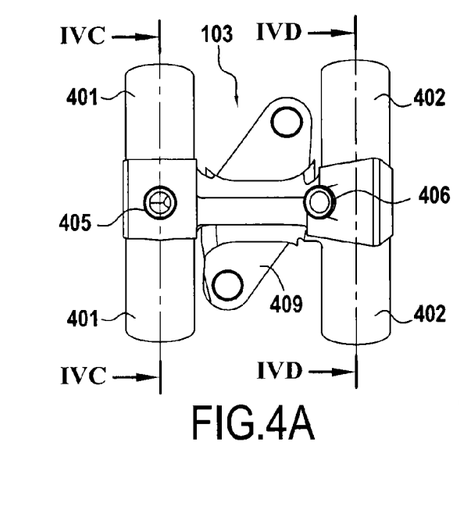
FIGS. 4A, 4B, 4C, and 4D are respectively views from above and from below, and sections on lines IVC-IVC and IVD-IVD, showing a feed coupling of the injection manifold assembly of FIGS. 2A and 2B.
Figure 4B:
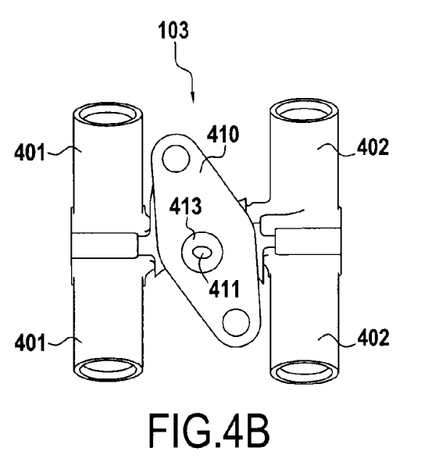
Figure 4C:
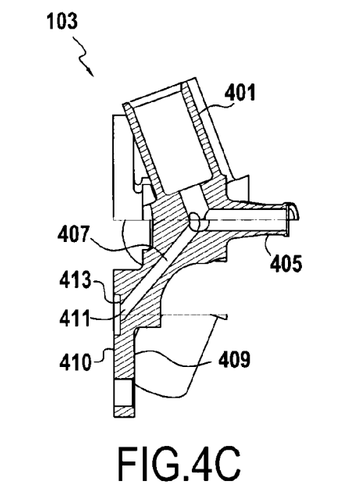
Figure 4D:
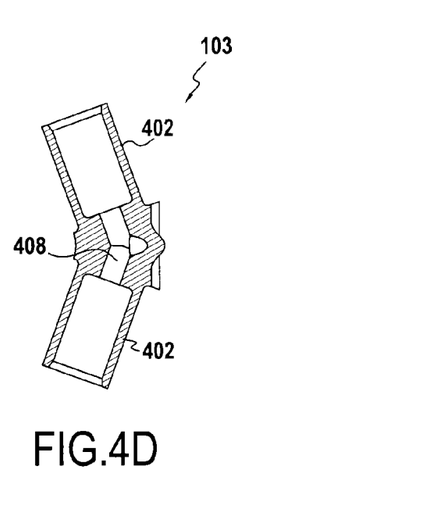
Figures 5A, 5B, 5C, 5D:
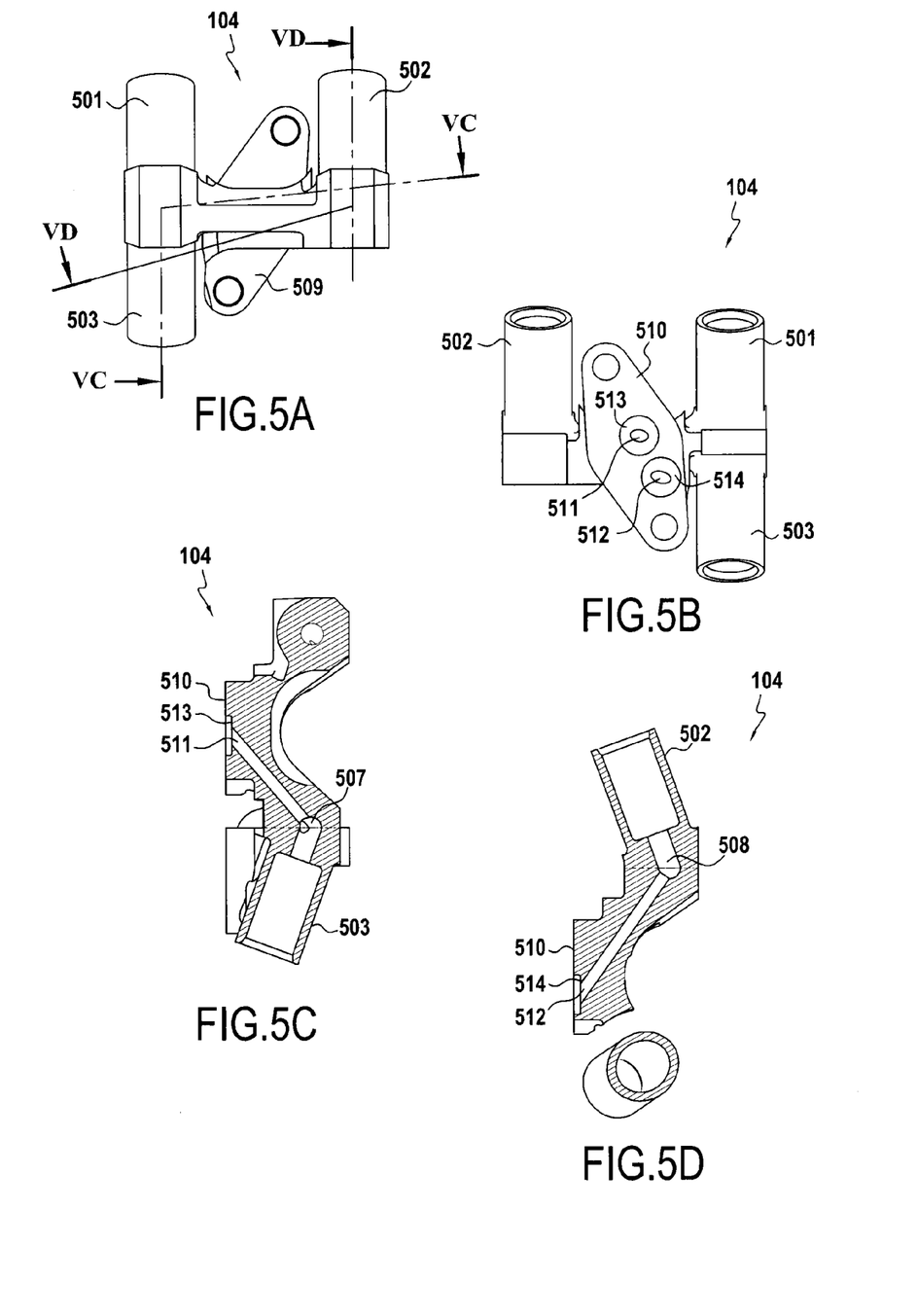
FIGS. 5A, 5B, 5C, and 5D are respectively views from above and from below, and sections on lines VC-VC and VD-VD of a double coupling of the injection manifold assembly of FIGS. 2A and 2B.

The injection manifold assembly 101 is modular and comprises a plurality of transfer tubes 102 connected by couplings 103, 104, 105, 106 of different types so as to make up said first and second circuits. As shown in particular in FIG. 2B, each connection between a transfer tube 102 and a coupling 103, 104, 105, or 106 is performed merely by inserting one end of the transfer tube 102 into a corresponding endpiece of the coupling 103, 104, 105, or 106. These connections are sealed by O-rings 107 received in annular grooves 108 in the outside surfaces at the ends of the transfer tubes 102, each closing the space between the corresponding outside surface and the inside surface of the corresponding endpiece. These grooves 108 can be seen in particular in FIGS. 3A and 3B where it can also be seen that the ends of each of the transfer tubes 102 are enlarged in order to stabilize the transfer tubes 102 better. As shown in FIGS. 2B and 3B, each transfer tube 102 is hollow so as to allow fuel to flow from one end of the transfer tube 102 to the other end.

A first coupling 103, referred to as a "feed" coupling, is situated in a central position in the manifold assembly 101 and is shown in detail in FIGS. 4A to 4D. This feed coupling 103 has first and second fuel inlets 405, 406 suitable for being connected respectively to said first and second sources of fuel, and it presents on either side a first endpiece 401 for receiving one end of a transfer tube 102 of the main circuit for feeding the tube with fuel from said main source, and a second endpiece 402 for receiving one end of a transfer tube 102 of the auxiliary circuit for feeding the tube with fuel from said second source. Said first endpieces 401 are in fluid flow communication with the first fuel inlet 405 via a first cavity 407 of the feed coupling 103 in order to feed the main circuit and both sets of injectors 100, 100' with fuel, while said second endpieces 402 are in fluid flow communication with the second fuel inlet 406 via a second cavity 408 in order to feed the auxiliary circuit and the first set of injectors 100 with fuel in parallel to the main circuit. The cavities 407 and 408 are separated from each other inside the feed coupling 103 and they do not communicate directly with each other.

Figure 8A:
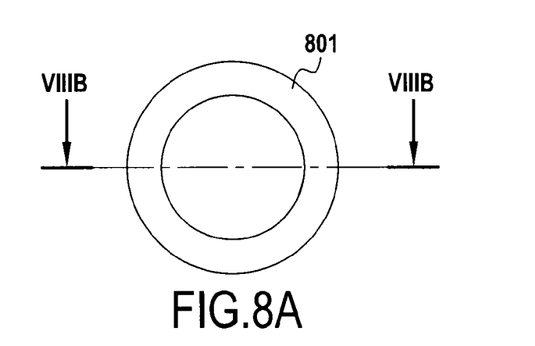
FIGS. 8A and 8B are respectively a face view and a section view of a C-section sealing gasket suitable for use in the above-mentioned couplings.
Figure 8B:
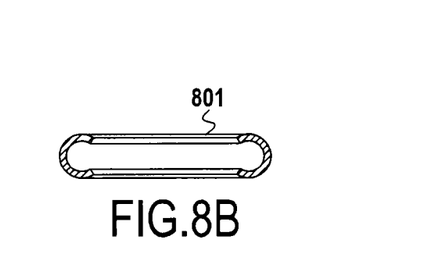

In addition, the feed coupling 103 also has a baseplate 409 at its base. This baseplate 409 serves not only to mount the feed coupling 103 on an outer wall of the combustion chamber 6 by means of bolts 109, but it also enables an injector 100' of the second set to be mounted with a baseplate 110' interposed between the baseplate 409 of the feed coupling 103 and the outer wall of the combustion chamber 6. The baseplate 409 has a mounting surface 410 with an orifice 411 in fluid flow communication with the first fuel inlet 405 and with said first endpieces 401 via the first cavity 407 of the feed coupling 103. Thus, this mounting surface 410 serves not only to mount an injector 100' of said second set, but it also serves to feed it with fuel coming from the first fuel source. The orifice 411 is surrounded by a local recess 413 in the mounting surface 410, suitable for receiving a C-section sealing ring 801, which may for example be made of metal, in order to prevent fuel leaking between the baseplates 409 and 110'. Such a gasket 801 is shown in FIGS. 8A and 8B. In the embodiment shown, this local recess 410 is formed by a spot face made in the material of the coupling 103. Nevertheless, other, alternative solutions could also be envisaged, such as for example receiving the sealing gasket in a spacer with a ground flat surface that is interposed between the baseplates 409 and 110'.

On either side of the feed coupling 103, the opposite ends of the transfer tubes 102 that are connected directly to the feed coupling 102 are received in respective endpieces of couplings of a second type, referred to as a "double" coupling 104. Such a double coupling 104 is shown in greater detail in FIGS. 5A to 5D. The double coupling 104 has a first endpiece 501, a second endpiece 502, and a third endpiece 503. The first endpiece 501 receives the end of the transfer tube 102 opposite from its end received in the first endpiece 401 of the feed coupling 103, while the second endpiece 502 receives the end of the transfer tube 102 that is opposite from its end received in a second endpiece 402 of the feed coupling 103. The third endpiece 503 is situated on a side opposite from the first endpiece 501 and it receives one end of another coupling tube 102 for extending the main circuit beyond the double coupling 104. For this purpose, the first and second endpieces 501 and 503 are in fluid flow communication through a first cavity 507 of the double coupling 104.

In addition, the double coupling 104 also includes a baseplate 509 at its base. This baseplate 509 serves not only to mount the double coupling 104 on an outer wall of the combustion chamber 6 with bolts 109, but it also serves to mount an injector 100 of the first set, having a baseplate 110 interposed between the baseplate 509 of the double coupling 104 and the outer wall of the combustion chamber 6. The baseplate 509 presents a mounting surface 510 with a first orifice 511 in fluid flow communication with said first and third endpieces 501, 503 via said first cavity 507 of the double coupling 104, and also a second orifice 512 in fluid flow communication with the second endpiece 502 via a second cavity 508 of the double coupling 104. The cavities 507 and 508 may be separate from each other inside the double coupling 104 with no direct communication between each other. The mounting surface 510 thus serves not only to mount an injector 100 of said first set, but it also serves to feed it in parallel with fuel coming from the first and second sources of fuel. Each of the orifices 511 and 512 is surrounded by a local recess 513, 514 in the mounting surface 510, enabling C-section sealing gaskets 801 to be installed to prevent leaks of fuel between the baseplates 509 and 110.

Beyond the double couplings 104, the first circuit is extended by transfer tubes 102 successively connected together by single couplings 105. One such single coupling 105 is shown in greater detail in FIGS. 6A to 6C. The single coupling 105 presents a first endpiece 601 and a second endpiece 603. The first endpiece 601 receives one end of a transfer tube 102 of the main circuit, while the second endpiece 603, situated on the side opposite from the first endpiece 601, receives one end of another transfer tube 102 of the main circuit. These first and second endpieces 601 and 603 are in fluid flow communication via a cavity 607 in the coupling 105.

Figure 6A:
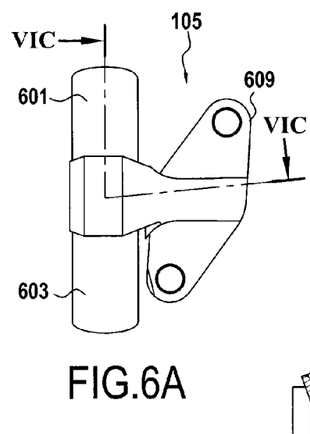
FIGS. 6A, 6B, and 6C are respectively views from above and below, and a section view on line VIC-VIC showing a first type of single coupling for the injection manifold assembly of FIGS. 2A and 2B.
Figure 6B:
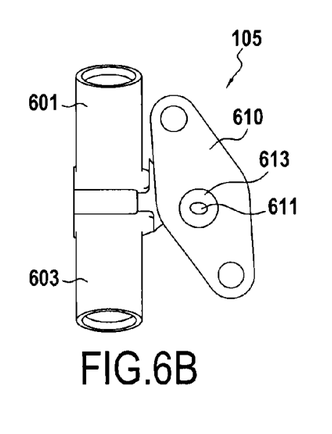
Figure 6C:
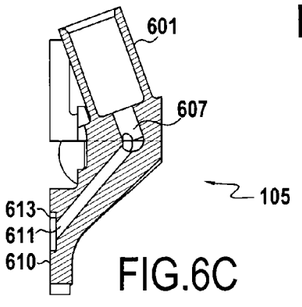

The single coupling 105 also includes a baseplate 609 at its base. This baseplate 609 serves not only to mount the single coupling 105 on an outer wall of the combustion chamber 6 with bolts 109, but it also serves to mount an injector 100' of the second set, having a baseplate 110' interposed between the baseplate 609 of the single coupling 105 and the outer wall of the combustion chamber 6. The baseplate 609 presents a mounting surface 610 with an orifice 611 in fluid flow communication with said first and second endpieces 601, 603 via the cavity 607 in the single coupling 105. Thus, this mounting surface 610 serves not only to mount an injector 100' of said second set, but it also serves to feed it with fuel coming from the second source of fuel via the main circuit of the manifold assembly 101. The orifice 611 is surrounded by a local recess 613 in the mounting surface 610, enabling a C-section sealing gasket (not shown) to be installed in order to avoid fuel leaking between the baseplates 609 and 110'.

Figure 7A:
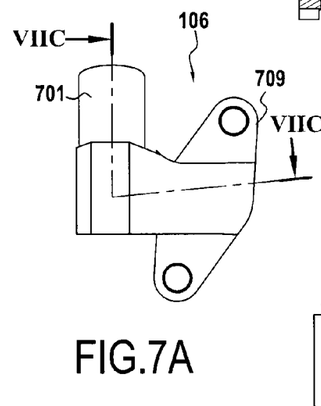
FIGS. 7A, 7B, and 7C are respectively views from above and below, and a section view on line VIIC-VIIC showing a second type of single coupling for the injection manifold assembly of FIGS. 2A and 2B.
Figure 7B:
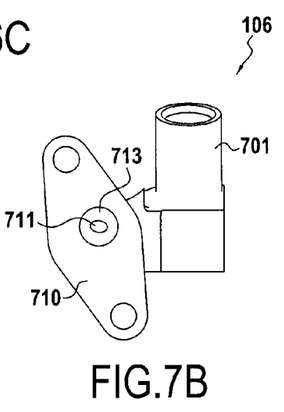
Figure 7C:
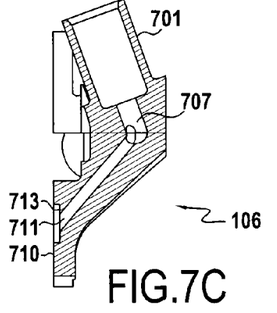

The injection manifold assembly 110 also has terminal single couplings 106 forming the ends of the first circuit. One such terminal single coupling 106 is shown in greater detail in FIGS. 7A to 7C. This terminal single coupling 106 presents a single endpiece 701 that receives one end of the last transfer tube 102 on either side of the main circuit. The terminal single coupling 106 also includes a baseplate 709 at its base. This baseplate 709 serves not only to mount the terminal single coupling 106 on an outer wall of the combustion chamber 6 with bolts 109, but it also serves to mount an injector 100' of the second set, having a baseplate 110' interposed between the baseplate 709 of the terminal single coupling 106 and the outer wall of the combustion chamber 6. The baseplate 709 presents a mounting surface 710 with an orifice 711 in fluid flow communication with said first endpiece 701 via a cavity 707 in the terminal single coupling 106. Thus, this mounting surface 710 serves not only to mount an injector 100' of said second set, but it also serves to feed it with fuel coming from the first source of fuel via the main circuit of the manifold assembly 101. The orifice 711 is surrounded by a local recess 713 in the mounting surface 710, enabling a C-section sealing gasket 801 to be installed in order to avoid fuel leaking between the baseplates 709 and 110'.

It should be observed that the double couplings 104, the single couplings 105, and the terminal single couplings 106 on either side of the feed coupling 103 are not identical, but rather are symmetrical with the corresponding couplings on the opposite side. Thus, the double coupling 104 shown in FIGS. 5A to 5D corresponds only to the double coupling 104 on one side of the feed coupling 103, however the double coupling on the opposite side is substantially symmetrical thereto. The same applies for the single coupling 105 shown in FIGS. 6A to 6C and for the terminal single coupling 106 shown in FIGS. 7A to 7C.

In operation, when starting the engine 1, a flow of fuel is delivered only to the injectors 100 of the first set from the second source of fuel and via the second fuel inlet 406 and the second cavity 408 of the feed coupling, the transfer tubes 102 of the auxiliary circuit, and the second cavities 508 of the double couplings 104. After the engine has started, an increasing flow rate of fuel is delivered to both sets of injectors 100 and 100' from the first source of fuel via the first fuel inlet 405 and the first cavity 407 of the feed coupling 103, the transfer tubes 102 of the main circuit, the first cavities 507 of the double couplings 104, and the single couplings 105 and the terminal single couplings 106. Finally, once the turbine has reached a predetermined operating speed, each of the injectors 100 and 100' injects fuel at a substantially identical rate into the combustion chamber 6. Thus, at this predetermined speed, the flow rate delivered by the main and auxiliary circuits to each of the injectors 100 of the first set is substantially identical to the flow rate delivered by the circuit to each of the injectors 100' of the second set.

Although the present invention is described with reference to a specific embodiment, it is clear that various modifications and changes can be made to these embodiments without going beyond the general ambit of the invention as defined by the claims. In addition, individual characteristics of the various embodiments mentioned may be combined in additional embodiments. Consequently, the description and the drawings could be considered in a sense that is illustrative rather than restrictive.

The invention claimed is:

1. An injection manifold assembly for a turbomachine, the injection manifold assembly comprising:

a first set of transfer tubes connected so as to form a main circuit for feeding fuel to at least a first set of injectors and a second set of injectors;

a second set of transfer tubes connected in parallel with the first set of transfer tubes so as to form an auxiliary circuit for feeding fuel to said first set of injectors; and a double coupling presenting at least one first endpiece receiving one end of a transfer tube of the main circuit, a second endpiece receiving one end of a transfer tube of the auxiliary circuit, and a mounting surface with a first orifice in fluid flow communication with the first endpiece and a second orifice in fluid flow communication with the second endpiece, said mounting surface of the double coupling being suitable for connecting the double coupling to an injector of said first set of injectors; and a single coupling presenting at least a first endpiece receiving one end of a transfer tube of the main circuit, and a mounting surface with an orifice in fluid flow communication with the first endpiece, said mounting surface of the single coupling being suitable for connecting the single coupling to an injector of said second set of injectors.

2. An injection manifold assembly according to claim 1, wherein the single coupling does not present any endpiece in fluid flow communication with the auxiliary circuit.

3. An injection manifold assembly according to claim 1, wherein the double coupling also presents a third endpiece receiving one end of a second transfer tube of the main circuit and also in fluid flow communication with the first orifice.

4. An injection manifold assembly according to claim 1, wherein said single coupling also presents a second endpiece, receiving one end of another transfer tube of the main circuit and also in fluid flow communication with the orifice in the mounting surface of the single coupling.

5. An injection manifold assembly according to claim 1, further including a feed coupling suitable for being connected to a first source of fuel and presenting at least a first endpiece receiving one end of a transfer tube of the main circuit for feeding it with fuel from said first source.

6. An injection manifold assembly according to claim 5, wherein said feed coupling also includes a mounting surface with an orifice in fluid flow communication with the first endpiece of the feed coupling, said mounting surface of the feed coupling being suitable for connecting the feed coupling to an injector of said second set of injectors for feeding it with fuel from said first source.

7. An injection manifold assembly according to claim 5, wherein said feed coupling is also suitable for being connected to a second source of fuel in parallel with the first source and also presents at least one second endpiece receiving one end of a transfer tube of the auxiliary circuit for feeding it with fuel from said second source.

8. A turbomachine combustion chamber including an injection manifold assembly comprising:

a first set of transfer tubes connected so as to form a main circuit for feeding fuel to at least a first set of injectors and a second set of injectors;

a second set of transfer tubes connected in parallel with the first set of transfer tubes so as to form an auxiliary circuit for feeding fuel to said first set of injectors; and a double coupling presenting at least one first endpiece receiving one end of a transfer tube of the main circuit, a second endpiece receiving one end of a transfer tube of the auxiliary circuit, and a mounting surface with a first orifice in fluid flow communication with the first endpiece and a second orifice in fluid flow communication with the second endpiece, said mounting surface of the double coupling being suitable for connecting the double coupling to an injector of said first set of injectors; and a single coupling presenting at least a first endpiece receiving one end of a transfer tube of the main circuit, and a mounting surface with an orifice in fluid flow communication with the first endpiece, said mounting surface of the single coupling being suitable for connecting the single coupling to an injector of said second set of injectors.

9. A turbomachine including a combustion chamber including an injection manifold assembly comprising:

a first set of transfer tubes connected so as to form a main circuit for feeding fuel to at least a first set of injectors and a second set of injectors;

a second set of transfer tubes connected in parallel with the first set of transfer tubes so as to form an auxiliary circuit for feeding fuel to said first set of injectors; and a double coupling presenting at least one first endpiece receiving one end of a transfer tube of the main circuit, a second endpiece receiving one end of a transfer tube of the auxiliary circuit, and a mounting surface with a first orifice in fluid flow communication with the first endpiece and a second orifice in fluid flow communication with the second endpiece, said mounting surface of the double coupling being suitable for connecting the double coupling to an injector of said first set of injectors; and a single coupling presenting at least a first endpiece receiving one end of a transfer tube of the main circuit, and a mounting surface with an orifice in fluid flow communication with the first endpiece, said mounting surface of the single coupling being suitable for connecting the single coupling to an injector of said second set of injectors.

* * * * *